INVENTOR.
BY HARVEY E. MARVEL
Albert L. Jeffers
Attorney

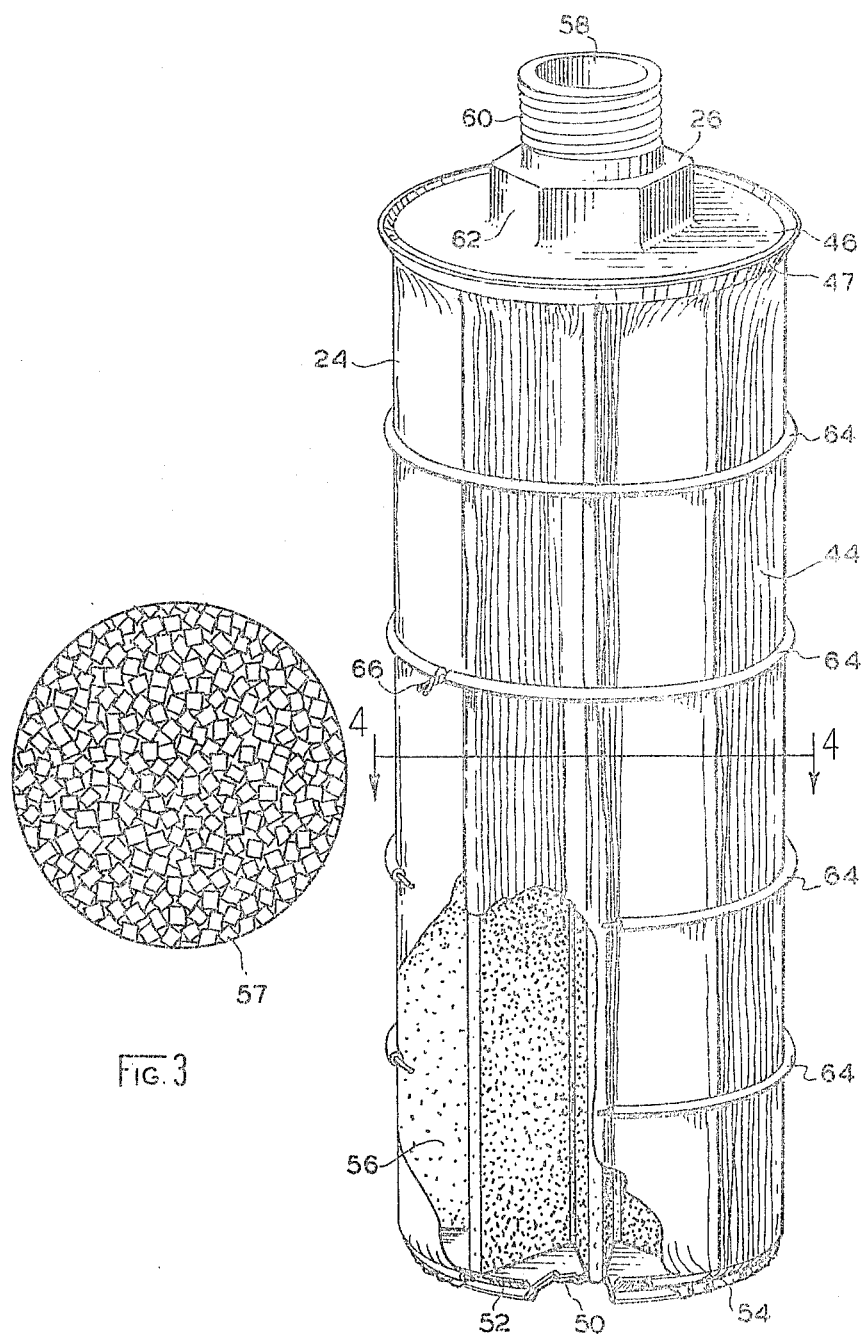

— continued on next page —

United States Patent Office 3,291,310
Patented Dec. 13, 1966

3,291,310
FILTER AND POROUS SUPPORT CORE
Harvey E. Marvel, Pierceton, Ind., assignor to Bowser, Inc., Cookeville, Tenn., a corporation of Indiana
Filed Apr. 24, 1964, Ser. No. 362,441
6 Claims. (Cl. 210—169)

This application is a continuation-in-part of my pending application Serial No. 823,670 filed June 29, 1959, subsequently abandoned.

This invention relates in general to a filter, and more particularly to a filter element which is adapted to remove contaminants from liquids such as water and the like.

It is the general practice in the operation of filters to provide a periodic backwash cycle during which time the flow of fluid is reversed through the filter to remove the filter cake together with contaminants which may have collected on the filter cake. The filter element must therefore be capable of conducting fluid flow under pressure in reverse directions without crumbling or deteriorating.

One of the principal objects of the present invention is to provide a filter element in which the filter cake may be more readily removed during the backwash cycle, and also, a swimming pool filter element which will enable more infrequent backwash cycles.

A further object of the invention is to provide an improved filter core material which will have a high degree of porosity and will yet be sufficiently rigid and possess sufficient internal strength to resist damage under fluid pressure as the fluid passes through the filter core material. It is provided that the core material will have sufficient porosity so that backwash pressure is developed more on the filter sleeve surrounding the core than on the core itself.

A further object of the invention is to provide a novel composition of the filter core which can be more easily and economically constructed and is inert to the liquid, i.e., the material is non-electrolytic. Owing to the novel construction material, the core can be formed into any desired cross sectional shape according to the area-to-diameter ratio design preference.

Another feature of the invention lies in the provision of a flexible woven filter sleeve which surrounds the core and is expandable during backwash to break up the filtering agent which is formed as a cake over the outer surface of the filter sleeve.

Other objects and features of the invention will become more apparent from a consideration of the following description which proceeds with reference to the accompanying drawings, wherein:

FIGURE 2 is an enlarged isometric view of one of the filter elements shown removed from the filter case assembly, the bottom portion of the filter sleeve being broken away to illustrate the filter core;

FIGURE 3 is an enlarged detail view of the filter core showing the agglomerated material which is fused to form the filter core;

Figure 1:
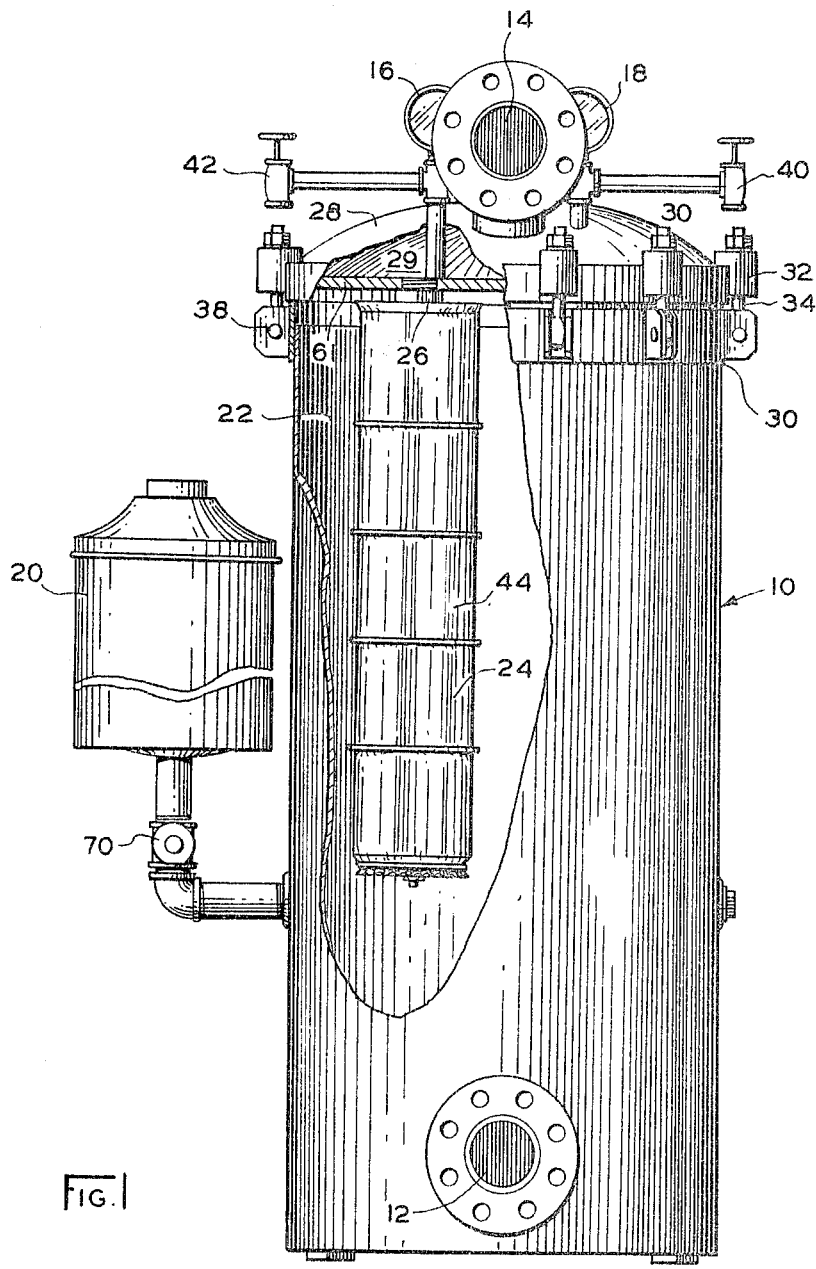
FIGURE 1 is a side elevation view of a filter case assembly, a part of the filter case being broken away to show the filter element.

The filter case assembly, designated generally by reference numeral 10, includes an inlet 12 and outlet 14 through which the fluid enters and leaves the filter case assembly 10 during filtering operation.

Suitable gauges 16 and 18 are provided to obtain pressure differential values during filter operation. At the one side of filter case assembly is a precoat pot 20 which contains a filtering agent such as diatomaceous earth or other suitable filter agent. Within the filter case assembly is a chamber 22 which receives the incoming flow of liquid, and a number of filter elements 24 are suspended at ends 26 from the upper portion 28 of the filter case assembly. A cover 30 is clamped over the top of the filter case assembly in any suitable manner, such as by hold-down lugs 32 and eye-bolts 34 hinged to lock ring 36 by eye-bolt pins 38. Valves (not shown) are used to regulate the circulation of liquid through the filter case assembly. The valves 40 and 42 are used to vent the upper chamber 29 and lower chamber 22, respectively.

Referring next to FIGURE 2, each filter element 24 comprises a sleeve 44 which is constructed of closely woven material, preferably polyethylene; one suitable material is that supplied under manufacturer's number P-2201 manufactured by National Filtering Media Company. The filter sleeve is manufactured with sufficiently close weave so that none of the filtering agent which forms a cake over the outer surface of sleeve 44 will pass through the pores of the filter sleeve 44 and into the interior of the filter element 24.

Figure 4:
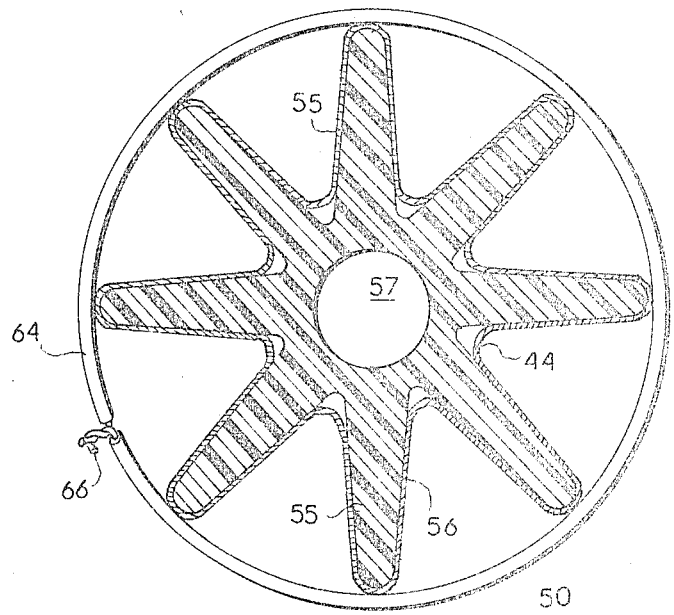
FIGURE 4 is a view taken along line 4—4 in FIGURE 2.

An upper end plate 46 which is grooved at its outer periphery is fitted within the top end of the cylindrical filter sleeve and a drawstring or wire 47 is tied over the end of the filter sleeve and fits within the groove to seal off the upper end of the filter sleeve. A similar arrangement is provided at the lower end of the element, there being a lower end plate 50 which is grooved at 52 and fits within the lower end of the sleeve 44. A drawstring or a draw wire 54 is drawn tightly around the lower end of the sleeve and fits within the groove 52 to seal off the lower end of the sleeve. Within the sleeve 44 and between the end plates 46 and 50 is a core 56 which forms a supporting structure for the filter sleeve 44. The core 56 is star-shaped in cross section to provide greater surface area for a given diameter of the core 56. The radial extensions 55 of the star-shaped cross section are in contact with the inner surface of the sleeve 44 to provide support for the sleeve 44 preventing its collapse under the pressure of fluid flowing from the chamber 22 to the interior of the filter element. Because of the star shape, and because the woven sleeve 44 has an appropriate expandable diameter, the woven sleeve 44 will lie snugly against the arms 55 of the star as shown in FIGURE 4 and thus be uniformly supported throughout the interior area when liquid passes in the filtering direction.

The core 56 consists of small cubical pellets 57 illustrated in FIGURE 3 which is substantially the size of the pellets actually used and constructed of a plastic material preferably Cycolac, this being a tradename for the chemical composition acrylonitrile-butadiene-styrene plastic.

In the formation of the core, the pellets are packed in a mold and then vibrated to compact the material. The pellets are then in intimate contact and are thereafter heated at about 400° F. for thirty minutes. Under these conditions, the pellets will soften so that the adjacent interfaces will adhere to each other and will become fused upon cooling. The time and temperature values are not critical and will vary considerably depending upon the weight of the mold and its construction. The only critical consideration is that the temperature and time values will not produce a melting of the pellets.

Figure 5:
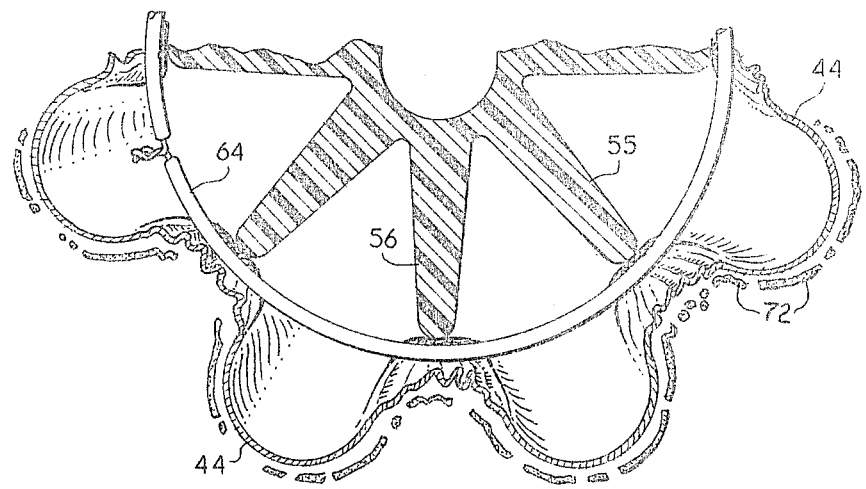
FIGURE 5 is a partial detail view illustrating the ballooning out of the sleeve during the backwash cycle.

The size of the pellet has a bearing on the porosity of the core. The smaller pellets will produce a more solid core and therefore one having less porosity, and, conversely, the larger pellets will provide greater porosity and less density. In this respect the core 56 is constructed so that the porosity is greater than the porosity of the sleeve 44 whereby the backwash pressure is developed more on the filter sleeve 44 which surrounds the core 56 than on the core thus enabling the sleeve 44 to balloon outwardly as illustrated in FIGURE 5. With these considerations, it will be an easy matter for those skilled in the art to select a pellet size best adapted to their particular usage.

Centrally of the core is a longitudinal passage 57 which conducts the inflowing fluid to an outlet fitting 58 which is threaded on its outer surface 60 and includes an irregularly sided boss 62 adapted for any tool which can fasten the end 26 onto the deck plate 61. At spaced points along the length of the sleeve 44 are reinforcing bands 64 which are tied together at their ends and twisted to effect whatever tension necessary for obtaining a proper grip on the sleeve 44. The bands 64 also prevent slippage of the sleeve holding it in proper place with respect to the core 56. The ends 66 of the bands 64 are tied together between adjacent projections of the star-shaped cross section core.

In operation, the filtering agent is mixed with the liquid to form a slurry which is placed in the precoat pot 20. The valve 70 from the precoat pot is opened so that the slurry will drain into the chamber 22. The valve 70 is then closed and the inlet and outlet valves are then opened and the filtering agent forms a layer or cake over the outer surface of the filtering sleeve 44 to whatever depth is preferred. The arrangement of valves and their operation forms no part of the present invention, and for details of typical piping arrangement reference may be made to U.S. Patent No. 2,549,063, entitled, "Liquid Separation Method and Apparatus," issued April 17, 1951.

Following the precoat operation, the valves are again adjusted for filtering operation, during which time the incoming fluid bypasses the precoat pot 20 and is passed through the filtering agent cake where the contaminants are removed. The fluid then passes through the pores of the filter sleeve 44 and enters the interior of the filter element. The surface of the star-shaped core 56 is at least substantially equal to the interior surface of the filtering sleeve 44 so as to give uniform interior surface support throughout the interior surface of the filtering sleeve 44. The core 56, being permeable, will allow the fluid to pass inwardly to the longitudinal passage 57 and the fluid flow is directed upwardly in a continuous flow and then to the outlet 14. Since the core 56 is uniform in cross section from one end to the other of the filter element, the external pressure on the filter sleeve 44 is uniform throughout.

When the filter agent cake collects an excess of contaminants, there results an appreciable drop in flow between inlet 12 and outlet 14 so that the filter cake must be removed and replaced for efficient operation. This is accomplished by backwash operation, during which time the fluid flow is reversed, entering the outlet 14 and leaving through inlet 12. The structure for accomplishing this is not a part of the present invention and can be accomplished in any of several known manners, for example, that shown in U.S. Patent No. 2,549,063 (supra).

The reverse flow of fluid entering the outlet 14 flows through the interior of each of the filter elements 24 passing downwardly in the passage which is constructed longitudinally within the core 56. Since the cross section of the core does not vary throughout the entire length of the core, the fluid pressure is therefore distributed evenly along the length of the filter element.

Fluid pressure causes the sleeve 44 to flex or balloon outwardly as shown in FIGURE 5, causing the filter cake 72 which is formed over the outer surface of the sleeve 44 to break away from the sleeve 44. The reverse flow of liquid passing from the interior of the sleeve through the pores in the sleeve effectively washes away all of the filter agent cake together with any of the contaminants which are collected on the filter agent cake.

The piping arrangement is such that the removed filter agent is swept out of the chamber 22 and through a drain valve (not shown) which removes the liquid, filtering agent and contaminants to a sump. The backwash operation continues until all of the filtering agent is flushed from the chamber 22.

When the backwash operation is completed, the valving arrangement is operated so that a new filter agent cake is applied over the outer surface of the filter sleeve 44, and normal filtering operation is then resumed.

Various modifications may be made in the filter element structure. For example, the end plates 46 and 50 may be made of plastic material, stampings, etc.

One of the principal advantages of the present invention is that the supporting core 56 is sufficiently porous so that during backwash operation, substantially none of the backwash pressure of the fluid is exerted on the core but instead is exerted on the sleeve surrounding the core. This prevents any fracturing or breaking up of the core during the operation. It is quite economical to manufacture the core, and in whatever shape is desired because the pellets are sufficiently small to assume various shapes and dimensions. After fusing, the pellets are adequately bonded together thereby providing a convenient and economical method of manufacture. The plastic material which forms the core is a readily available and inexpensive material.

Although the dimensions of the filter element will vary considerably depending upon the filter case assembly, one suitable design is that in which two square feet of filter area is provided per lineal foot of core having a diameter of 4½ inches. The diameter of the sleeve 44 is approximately 7½ inches, using the 4½ inch diameter supporting core 56.

During backwash operations, the filter agent is effectively removed throughout the entire length of the filter element 24 regardless of the degree of submergence of the filter element in the chamber 22 of the filter case assembly. Proper removal of the filter cake is a particularly difficult accomplishment in prior art devices in the regions at the top of the filter element and this is especially true when the filter element is submerged to any great extent. The greater efficiency of filter cake removal in the present invention is attributed to the uniform fluid pressure of the backwash liquid which is effective over the entire area of the filter element and the ballooning action of the filter sleeve which breaks up the filter cake, causing it to fall away.

While only a single example embodiment has been chosen to illustrate the invention, it will be understood that this is only illustrative of the invention. It is reasonably expected that those skilled in the art will make numerous adaptations and revisions of the invention to meet specific requirements and its is intended that such revisions and variations of the invention as incorporate the herein disclosed principles will be included within the terms of the accompanying claims as equivalents of the invention.

I claim:

1. A filter element comprising, in combination:
    (a) a previous filter sleeve of flexible woven material,
    (b) said filter sleeve adapted to support a cake over its outer surface, said cake formed from a filter agent composed of particles having a size greater than the porosity of said filter sleeve,
    (c) a star-shaped support core having a continuous hub with outwardly radially extending arms spaced circumferentially around said hub and located interiorly of said filter sleeve to provide uniform support therefor,
    (d) said support core constructed of a non-electrolytic fused porous aggregate, said support core having a longitudinal passage through the center thereof to provide substantially uniform radial fluid flow along the length of said filter sleeve, (e) said filter sleeve being substantially larger in diameter than the support core to permit said sleeve to lie snugly against the arms of the star-shaped support core and thus be uniformly supported throughout its interior area when liquid passes in the filtering direction and to balloon outwardly to break the filter cake when the flow of liquid is reversed to the filtering direction, (f) said filter sleeve having sealing means at the opposite ends thereof, and (g) means for supporting said filter element while providing fluid flow in each of opposite directions during the filtering and backwash operations respectively.

2. A filter element for a swimming pool filter comprising, in combination:

(a) a porous filter sleeve of flexible woven material having fluid tight sealed ends to obtain fluid flow across said flexible sleeve, (b) a star-shaped supporting core having a continuous hub with outwardly radially extending arms within said flexible sleeve to provide a uniform backing for said flexible sleeve, (c) said supporting core comprising a fluid permeable fused aggregate having a passage formed centrally therein and extending the length of said filter element to conduct fluid as a filtrate during filter operation and as a backwash in the reverse direction of fluid flow, (d) said filter sleeve being substantially larger in diameter than the supporting core to permit said sleeve to lie snugly against the arms of the star-shaped supporting core and thus be uniformly supported throughout its interior area when liquid passes in the filtering direction and to balloon outwardly to break the filter cake when the flow of liquid is reversed to the filtering direction, (e) said supporting core have a greater porosity than the filter sleeve so that the backwash pressure developed is greater on the filtering sleeve than on said supporting core, and (f) means for supporting said filter element while providing fluid flow in each of opposite directions during the filtering and backwash operations respectively.

3. In a swimming pool filter having a filter agent adapted to form a filter cake on the filter element comprising, in combination:

(a) a porous filter sleeve of flexible woven material having openings smaller than that of said filter agent so that said filter sleeve will support the filter agent which forms as a filter cake over the outer surface of said filter sleeve, (b) a supporting core having a continuous hub with outwardly radially extending arms and disposed within said filter sleeve to provide a uniform backing therefore, and comprising a fluid pervious fused aggregate having a greater porosity than said sleeve to provide less resistance to fluid flow therethrough than said filter sleeve, (c) said woven filter sleeve being substantially larger in diameter than the supporting core so that it will balloon outwardly during the backwash cycle to break the filter cake away from said filter sleeve, and (d) means for supporting said filter element while providing fluid flow in each of opposite directions during the filtering and backwash operations respectively.

4. The filter structure in accordance with claim 3 wherein said supporting core is constructed of star-shaped cross section including radial arms to uniformly support the interior area of the filter sleeve when liquid passes in the filtering direction, said supporting core composed of heat fusible plastic particles of acrylonitrile-butadiene-styrene material in the form of pellets.

5. The filter structure in accordance with claim 3 wherein said supporting core includes a longitudinal passage formed centrally thereof to conduct fluid under pressure at a uniform radial flow to within said passage and from said passage during filtration and backwash operations respectively to distribute fluid pressure substantially evenly throughout said supporting core whereby the fluid pressure will be evenly distributed on the filter sleeve to break substantially all of the filter cake.

6. The filter structure in accordance with claim 3 wherein said supporting core is constructed of fused pellets composed of non-electrolytic corrosion-resistant plastic material, said supporting core having greater porosity than said filter sleeve so that during the backwash cycle the fluid pressure will be greater on the filter sleeve than on the supporting core.

References Cited by the Examiner

UNITED STATES PATENTS

| | | | |
|---|---|---|---|
| 1,645,712 | 10/1927 | Myers | 210—484 X |
| 1,671,958 | 5/1928 | Williams | 210—493 X |
| 2,027,681 | 1/1936 | Durant et al. | 210—356 |
| 2,297,248 | 9/1942 | Rudolph | 210—510 X |
| 2,482,062 | 9/1949 | Hanson | 210—510 X |
| 2,549,063 | 4/1951 | De Haven | 210—193 X |
| 2,743,017 | 4/1956 | Kovacs | 210—315 |
| 2,802,809 | 8/1957 | Hayes. | |
| 2,804,978 | 9/1957 | Roden et al. | 210—315 |
| 2,826,308 | 3/1958 | Koupal | 210—356 X |
| 2,875,901 | 3/1959 | Bottum | 210—484 |
| 2,985,307 | 5/1961 | Grasmere et al. | 210—169 |
| 3,206,178 | 9/1965 | Lamb | 261—124 X |

FOREIGN PATENTS

| | | |
|---|---|---|
| 566,327 | 11/1958 | Canada. |
| 26,205 of 1903 | | Great Britain. |

OTHER REFERENCES

Modern Plastics, volume 34, No. 10, June 1956, page 182.

Thompson, M. S., Gum Plastics, Reinhold Publishing Corp., New York, 1958, pages 70–72.

REUBEN FRIEDMAN, *Primary Examiner.*

D. M. RIESS, *Assistant Examiner.*